(12) United States Patent
Okamoto

(10) Patent No.: US 10,293,545 B2
(45) Date of Patent: *May 21, 2019

(54) THREE-DIMENSIONAL MODELING APPARATUS, MANUFACTURING METHOD AND COMPUTER PROGRAM

(71) Applicant: SEIKO EPSON CORPORATION, Tokyo (JP)

(72) Inventor: Eiji Okamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 496 days.

This patent is subject to a terminal disclaimer.

(21) Appl. No.: 15/040,615

(22) Filed: Feb. 10, 2016

(65) Prior Publication Data

US 2016/0243761 A1 Aug. 25, 2016

(30) Foreign Application Priority Data

Feb. 25, 2015 (JP) ................................ 2015-034858

(51) Int. Cl.
| | |
|---|---|
| *B29C 64/112* | (2017.01) |
| *B29C 64/165* | (2017.01) |
| *B29C 64/386* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/112* (2017.08); *B29C 64/165* (2017.08); *B29C 64/386* (2017.08); *B29K 2995/0021* (2013.01); *B33Y 10/00* (2014.12); *B33Y 30/00* (2014.12); *B33Y 50/02* (2014.12)

(58) Field of Classification Search
CPC ...... B29C 64/10; B29C 64/106; B29C 64/112
See application file for complete search history.

(56) References Cited

U.S. PATENT DOCUMENTS

| 6,007,318 A | 12/1999 | Russell et al. |
| 6,612,824 B2 | 9/2003 | Tochimoto et al. |
| 2002/0167101 A1 | 11/2002 | Tochimoto et al. |
| 2005/0001356 A1 | 1/2005 | Tochimoto et al. |
| 2007/0007698 A1 | 1/2007 | Sano |

(Continued)

FOREIGN PATENT DOCUMENTS

| JP | 2000-280354 A | 10/2000 |
| JP | 2001-150556 A | 6/2001 |
| JP | 2005-067138 A | 3/2005 |

(Continued)

*Primary Examiner* — Peter L Vajda

(57) ABSTRACT

A three-dimensional modeling apparatus is provided with a head unit for modeling an object by discharging a liquid into each unit grille that is defined in accordance with modeling resolutions of a cross section body in an X direction and a Y direction and a lamination interval in a Z direction, and a control unit for controlling the head unit. In the case where one or more types of the chromatic liquids are discharged into the unit grille by controlling the head unit and the spatial volume of the unit grille is not filled with the one or more types of chromatic liquids, the control unit causes the achromatic liquid to be discharged into the unit grille in addition to the one or more types of chromatic liquids so as to fill the spatial volume of the unit grille with both the chromatic liquids and the achromatic liquid.

4 Claims, 6 Drawing Sheets

(56) References Cited

U.S. PATENT DOCUMENTS

2016/0129632 A1* 5/2016 Yamazaki ........... B29C 67/0059
425/132

FOREIGN PATENT DOCUMENTS

| JP | 2010-058519 A | 3/2010 |
| JP | 2011-073163 A | 4/2011 |
| JP | 2013-075390 A | 4/2013 |
| JP | 2015-123685 A | 7/2015 |

* cited by examiner

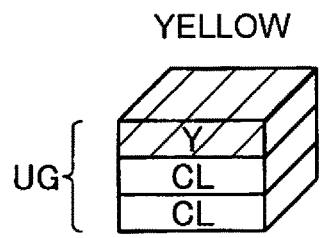
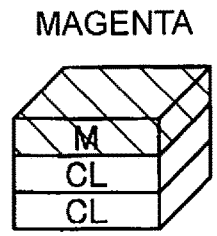
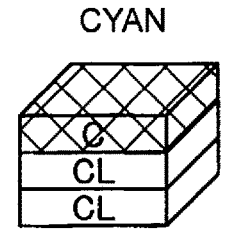
FIG. 3A  FIG. 3B  FIG. 3C
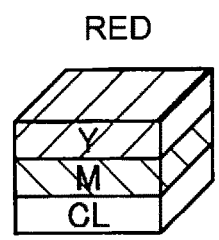
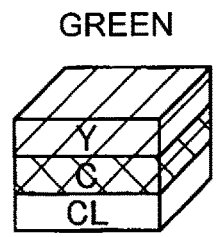
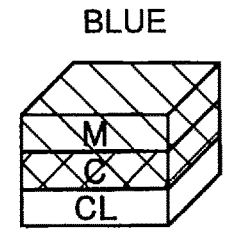
FIG. 3D  FIG. 3E  FIG. 3F
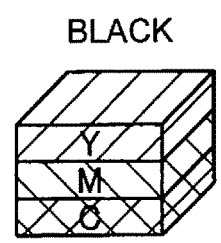
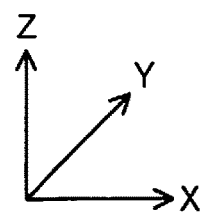
FIG. 3G

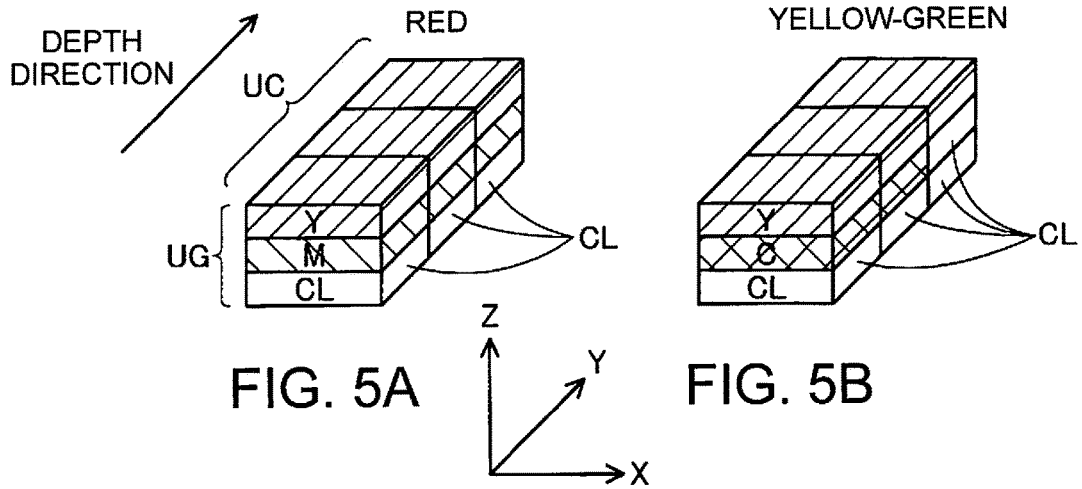
FIG. 5A  FIG. 5B
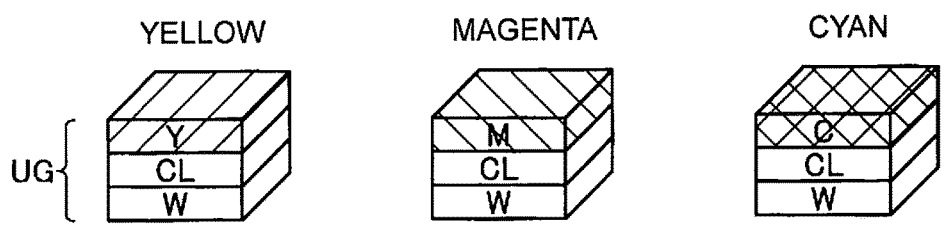
FIG. 6A  FIG. 6B  FIG. 6C
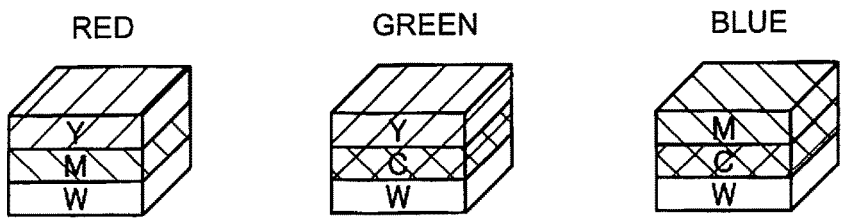
FIG. 6D  FIG. 6E  FIG. 6F
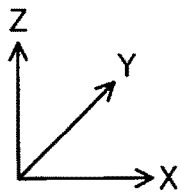

THREE-DIMENSIONAL MODELING APPARATUS, MANUFACTURING METHOD AND COMPUTER PROGRAM

BACKGROUND

1. Technical Field

The present invention relates to a three-dimensional modeling apparatus.

2. Related Art

In recent years, three-dimensional modeling apparatuses that adopt an inkjet technique have been attracting attention. With three-dimensional modeling apparatuses that adopt an inkjet technique, a three-dimensional object is modeled by performing, over a number of layers in the height direction (Z direction), a step of discharging a liquid having curability and forming a cross section body for one layer that lies in the horizontal direction (XY directions). For example, with a three-dimensional modeling apparatus described in JP-A-2011-73163, the color intensity is expressed by superimposing layers in which a peripheral portion is colored and layers in which a peripheral portion is not colored.

JP-A-2011-73163, JP-A-2001-150556, JP-A-2005-67138 and JP-A-2010-58519 are examples of related art.

However, with the technique described in JP-A-2011-73163, only one color can be expressed for each layer, and therefore there is the possibility that, when observed from outside, the apparent resolution deteriorates to be lower than the actual modeling resolution depending on the thickness of each layer, when expressing a neutral color by area gradation. Therefore, a technique that makes it possible to suppress deterioration of the apparent resolution in a technique for modeling a colored three-dimensional object by discharging a liquid is demanded.

SUMMARY

An advantage of some aspects of the invention is to solve at least some of the above-described problems, and the invention can be achieved as the following modes.

(1) According to one mode of the invention, a three-dimensional modeling apparatus for modeling a three-dimensional object by laminating a plurality of cross section bodies in a Z direction is provided. This three-dimensional modeling apparatus includes: a head unit for modeling the object by discharging a liquid, which is to be a material of the object, into each unit grille that is defined in accordance with a modeling resolution of the cross section body in an X direction, a modeling resolution of the cross section body in a Y direction, and a lamination interval of the cross section body in the Z direction; and a control unit for controlling the head unit. The head unit may be capable of individually discharging, into the unit grille, an achromatic liquid and a plurality of types of chromatic liquids for expressing a designated color, and in the case where one or more types of the chromatic liquids are discharged into the unit grille by controlling the head unit and the spatial volume of the unit grille is not filled with the one or more types of chromatic liquids, the control unit causes the achromatic liquid to be discharged into the unit grille in addition to the one or more types of chromatic liquids so as to fill the spatial volume of the unit grille with both the chromatic liquids and the achromatic liquid. With the three-dimensional modeling apparatus of such a mode, a three-dimensional object is colored in units finer than a unit grille, and thus it is possible to improve an apparent resolution when expressing an image on the surface of the object by area gradation. In addition, in the case where the total amount of chromatic liquids discharged into a unit grille is smaller than the spatial volume of the unit grille, the remaining spatial volume of the unit grille is filled with an achromatic liquid, and therefore it becomes possible to uniformize the volumes of all the unit grilles constituting the three-dimensional object. Therefore, the three-dimensional object can be accurately modeled.

(2) In the three-dimensional modeling apparatus of the above mode, the control unit, regarding one chromatic liquid out of the plurality of types of chromatic liquids, may express color gradation represented by the one chromatic liquid by changing the number of unit grilles into which the one chromatic liquid is to be discharged, in a unit grille array in which the unit grilles are aligned in a direction inwardly from a surface of the object. With the three-dimensional modeling apparatus of such a mode, the object is also colored in the depth direction, whereby it is possible to change the color intensity observed from the outside of the object. Therefore, it is possible to increase the number of colors that can be expressed per unit area on the surface of the object.

(3) In the three-dimensional modeling apparatus of the above mode, in the case where a plurality of the unit grilles into which the one chromatic liquid is to be discharged exist in the unit grille array, the one chromatic liquid may be discharged into the unit grilles such that the positions of the one chromatic liquid in the Z direction are the same, and the one chromatic liquid may be discharged into the unit grilles such that the one chromatic liquid is arranged on the surface side relative to the achromatic liquid in the unit grille array. With the three-dimensional modeling apparatus of such a mode, the color intensity of colored portions can be precisely expressed.

(4) In the three-dimensional modeling apparatus of the above mode, the color of the achromatic liquid may be white. With the three-dimensional modeling apparatus of such a mode, the color intensity of colored portions can be more precisely expressed.

The invention can also be achieved in various modes other than the modes as a three-dimensional modeling apparatus. For example, the invention can be achieved as a method for the three-dimensional modeling apparatus to model a three-dimensional object, a computer program for modeling a three-dimensional object under the control of the three-dimensional modeling apparatus, a non-transitory tangible recording medium on which the computer program is recorded, or the like.

BRIEF DESCRIPTION OF THE DRAWINGS

The invention will be described with reference to the accompanying drawings, wherein like numbers reference like elements.

FIGS. 3(A) to 3(G) are diagrams for explaining a method for expressing a color in the first embodiment.

FIGS. 5(A) and 5(B) are diagrams showing examples of chromatic ink having been registered in the depth direction of a three-dimensional object.

FIGS. 6(A) to 6(F) are diagrams showing examples of at least a portion of a unit grille having been filled with white ink.

DESCRIPTION OF EXEMPLARY EMBODIMENTS

A. First Embodiment

Figure 1:
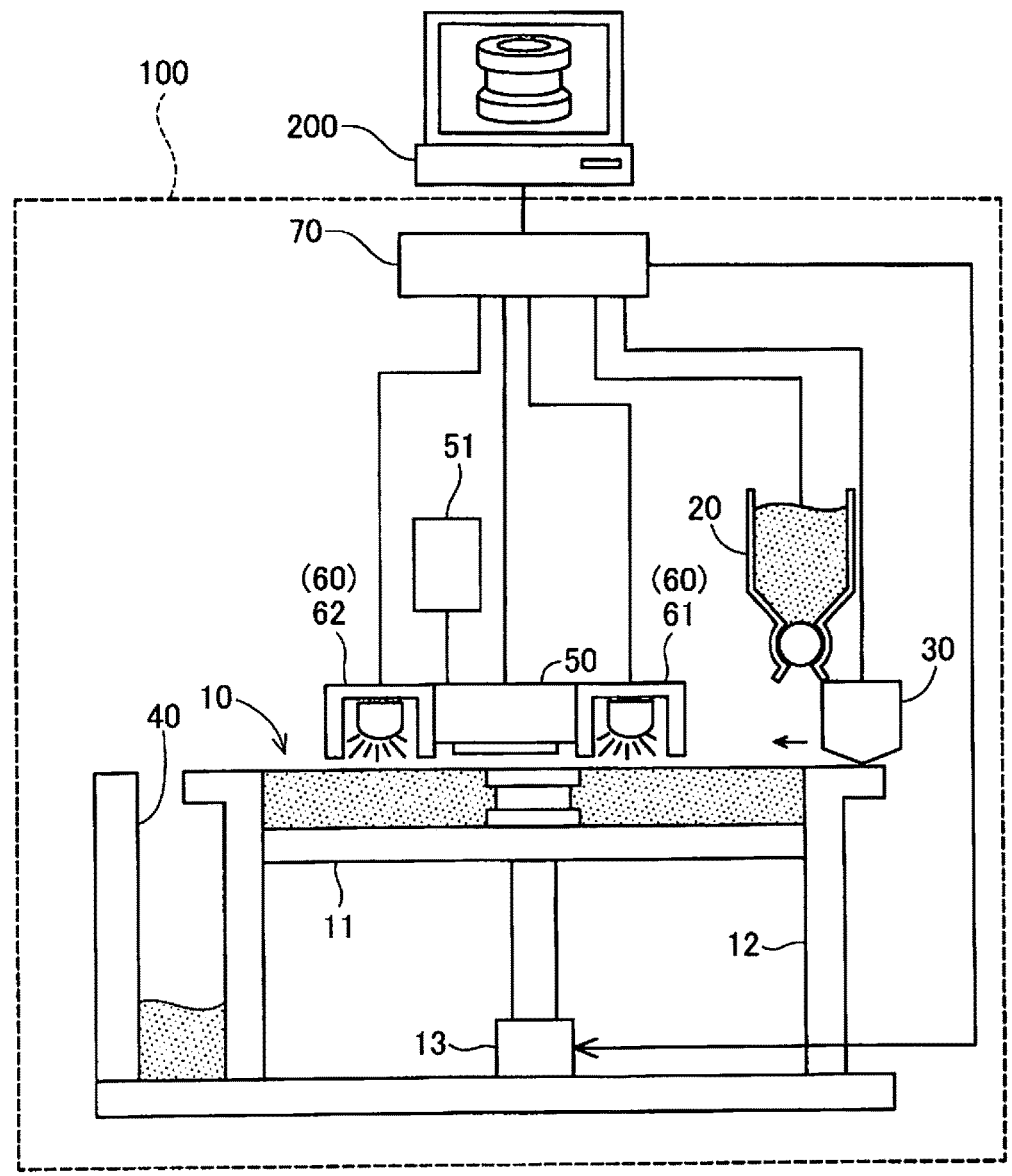
FIG. 1 is an explanatory diagram showing a schematic configuration of a three-dimensional modeling apparatus as a first embodiment.

FIG. 1 is an explanatory diagram showing the schematic configuration of a three-dimensional modeling apparatus as a first embodiment of the invention. A three-dimensional modeling apparatus 100 is provided with a modeling unit 10, a powder supply unit 20, a flattening mechanism 30, a powder collecting unit 40, a head unit 50, a curing energy applying unit 60, and a control unit 70. A computer 200 is connected to the control unit 70. The three-dimensional modeling apparatus 100 and the computer 200 can be collectively regarded as a "three-dimensional modeling apparatus" in a broad sense. In FIG. 1, an X direction, a Y direction and a Z direction that intersect orthogonally to one another are shown. The Z direction is a direction along a vertical direction, and the X direction is a direction along a horizontal direction. The Y direction is a direction perpendicular to the Z direction and the X direction.

The modeling unit 10 is a tank-shaped structure in which a three-dimensional object is modeled. The modeling unit 10 is provided with a modeling stage 11 that is flat and lies in an XY direction, a frame body 12 surrounding the periphery of the modeling stage 11 and erect in the Z direction, and an actuator 13 for moving the modeling stage 11 in the Z direction. The modeling stage 11 moves in the Z direction in the frame body 12 by the control unit 70 controlling the operations of the actuator 13.

The powder supply unit 20 is an apparatus for supplying powder into the modeling unit 10. The powder supply unit 20 is constituted by a hopper or a dispenser, for example.

The flattening mechanism 30 is a mechanism for flattening the powder supplied into the modeling unit 10 or on the frame body 12 and forming a powder layer on the modeling stage 11 by moving over the upper surface of the modeling unit 10 in the horizontal direction (XY directions). The flattening mechanism 30 is constituted by a squeegee or a roller, for example. The powder pushed out from the modeling unit 10 by the flattening mechanism 30 is discharged into the powder collecting unit 40 provided adjacent to the modeling unit 10.

The three-dimensional modeling apparatus 100 in the first embodiment uses a liquid having curability (hereinafter, referred to as "curable liquid") and the above powder as materials of a three-dimensional object. A mixture of a liquid resin material that is mainly composed of monomers and oligomers to which monomers are bonded, and a polymerization initiator that enters an excited state when irradiated with ultraviolet light, and acts on the monomers or the oligomers so as to start polymerization is used as a curable liquid. In addition, as the monomers of the resin material, relatively low molecular weight monomers are selected, and furthermore, the number of monomers included in one oligomer of the resin material is adjusted to be about a few molecules such that the curable liquid has a low viscosity that allows droplets to be discharged from the head unit 50. This curable liquid has a property of quickly curing and becoming a solid when the curable liquid is irradiated with ultraviolet light and the polymerization initiator is in an excited state, the monomers polymerize with one another and grow into oligomers, and the oligomers also polymerize with one another in places.

In this embodiment, powder particles on the surface of which a polymerization initiator of a different type from that contained in the curable liquid is attached is used as the powder. The polymerization initiator attached to the surface of the powder particles has a property of acting on the monomers or the oligomers so as to start polymerization when coming into contact with the curable liquid. Therefore, when the curable liquid is supplied to the powder in the modeling unit 10, the curable liquid permeates into the powder, comes into contact with the polymerization initiator on the surface of the powder particles, and cures. As a result, in a portion onto which the curable liquid is discharged, powder particles are coupled with one another by the curable liquid that has cured. Note that in the case of using, as the powder, powder particles having a polymerization initiator attached to the surface thereof, a curable liquid that does not contain a polymerization initiator can also be used.

The head unit 50 is an apparatus that receives supply of the above-described curable liquid from a tank 51 connected to the head unit 50 and discharges, in the Z direction, the curable liquid onto the powder layer in the modeling unit 10. In this embodiment, the head unit 50 can discharge, as the curable liquid, achromatic ink, and a plurality of types of chromatic ink for expressing a designated color. In this embodiment, the head unit 50 can discharge clear (CL) ink and white (W) ink as the achromatic ink. In addition, the head unit 50 can discharge cyan (C) ink, magenta (M) ink, and yellow (Y) ink as the chromatic ink. Note that the colors of the ink discharged by the head unit 50 are not limited thereto. The head unit 50 can move in the X direction and the Y direction with respect to a three-dimensional object modeled in the modeling unit 10. In addition, the head unit 50 can move in the Z direction relatively to the three-dimensional object, by the modeling stage 11 inside of the modeling unit 10 moving in the Z direction.

The head unit 50 of this embodiment is a so-called piezoelectric drive type droplet discharging head. The piezoelectric drive type droplet discharge head can discharge, as droplets, a curable liquid of a volume corresponding to a reduced volume of a pressure chamber, by filling the pressure chamber having a minute nozzle hole with the curable liquid and flexing the sidewall of the pressure chamber using a piezoelectric element. The control unit 70 that is described later can adjust the amount of the curable liquid per droplet to be discharged from the head unit 50 by controlling a voltage waveform to be applied to the piezoelectric element.

The curing energy applying unit 60 is an apparatus for applying energy for curing the curable liquid discharged from the head unit 50. In this embodiment, the curing energy applying unit 60 is constituted by a main curing light emitting apparatus 61 and a provisional curing light emitting apparatus 62 that are arranged so as to sandwich the head unit 50 in the X direction. When the head unit 50 is moved, the curing energy applying unit 60 also moves with the head unit 50. Ultraviolet rays as curing energy for curing the curable liquid are emitted from the main curing light emitting apparatus 61 and the provisional curing light emitting apparatus 62. The provisional curing light emitting apparatus 62 is used for performing provisional curing to fix the discharged curable liquid at the landing position thereof. The main curing light emitting apparatus 61 is used for completely curing the curable liquid after provisional curing. The energy of the ultraviolet rays emitted from the provisional curing light emitting apparatus 62 are 20 to 30% of the energy of the ultraviolet rays emitted from the main curing light emitting apparatus 61, for example.

The control unit 70 is provided with a CPU and a memory. The CPU has a function of modeling a three-dimensional object by controlling the actuator 13, the powder supply unit 20, the flattening mechanism 30, the head unit 50 and the curing energy applying unit 60 by loading a computer program stored in the memory or a recording medium to the memory and executing the program. This function, which will not be described in detail, includes a function of, in the case where one or more types of chromatic ink are discharged into a unit grille UG (see FIGS. 3(A) to 3(G)) that is described later by controlling the head unit 50 and the spatial volume of the unit grille UG is not filled with the one or more types of chromatic ink, causing achromatic ink to be discharged into the unit grille UG in addition to the one or more types of chromatic ink, such that the spatial volume of the unit grille UG is filled with both (one or more) chromatic ink and an achromatic I ink. The functions of the control unit 70 may be realized by an electronic circuit.

A method for modeling (manufacturing) a three-dimensional object using the three-dimensional modeling apparatus 100 will be briefly described. The computer 200 first slices polygon data indicating the shape of the three-dimensional object in accordance with a modeling resolution (lamination pitch) in the Z direction, and generates a plurality of cross section data in the XY directions. This cross section data has a predetermined modeling resolution in the X direction and the Y direction, and is represented by two-dimensional bitmap data in which a gradation value is stored for each element. The gradation value stored in each element represents the amount of a curable liquid to be discharged for an XY coordinate corresponding to the element. That is, in this embodiment, bitmap data designates, for the control unit 70 of the three-dimensional modeling apparatus 100, a coordinate for which the curable liquid is to be discharged and the amount of the curable liquid to be discharged.

Upon acquiring the cross section data from the computer 200, the control unit 70 of the three-dimensional modeling apparatus 100 forms a powder layer in the modeling unit 10 by controlling the powder supply unit 20 and the flattening mechanism 30. The control unit 70 then drives the head unit 50 so as to discharge the curable liquid onto the powder layer in accordance with the cross section data, subsequently controls the curing energy applying unit 60 so as to emit ultraviolet light toward the discharged curable liquid, and performs provisional curing and main curing. The curable liquid then cures due to the ultraviolet light, powder particles are coupled with one another, and a cross section body corresponding to cross section data for one layer is formed in the modeling unit 10. When the cross section body for one layer is formed in this manner, the control unit 70 drives the actuator 13 so as to lower the modeling stage 11 in the Z direction for a lamination pitch that is in accordance with a modeling resolution in the Z direction. When the modeling stage 11 has been lowered, the control unit 70 forms a new powder layer on the cross section body that has already been formed on the modeling stage 11. When the new powder layer is formed, the control unit 70 receives next cross section data from the computer 200 and forms a new cross section body by discharging the curable liquid onto the new powder layer and emitting ultraviolet light. In this manner, on receiving cross section data for each layer from the computer 200, the control unit 70 controls the actuator 13, the powder supply unit 20, the flattening mechanism 30, the head unit 50, and the curing energy applying unit 60 so as to form a cross section body for each layer, and consecutively laminates cross section bodies, thereby modeling a three-dimensional object.

Figure 2:
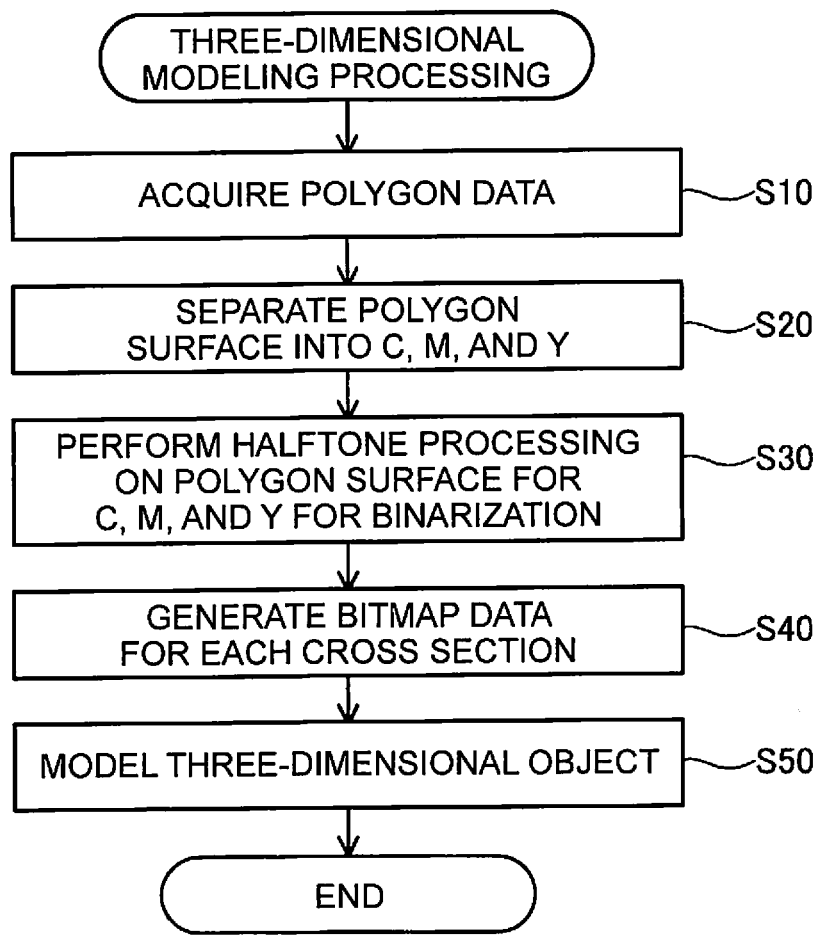
FIG. 2 is a flowchart of three-dimensional modeling processing in the first embodiment.

FIG. 2 is a specific flowchart of three-dimensional modeling processing executed in this embodiment. In this embodiment, the computer 200 first acquires polygon data indicating the shape of a three-dimensional object from an application program or the like being executed on a recording medium, a network or the computer 200 (step S10). When the polygon data is acquired, the computer 200 performs color separation on the images on the surfaces of polygons that are represented by the polygon data into C, M and Y (step S20), and performs halftone processing for each color (step S30). The images on the surfaces of the polygons are binarized by this halftone processing.

When the surface images of the polygons are binarized, subsequently, the computer 200 slices the polygon data in accordance with a modeling resolution in the Z direction, and generates bitmap data for each cross section (step S40). At this time, the computer 200 causes a value indicating whether or not to form dots of each of the colors of C, M and Y to be stored at coordinates in each piece of the cross section data that correspond to the outermost periphery of the object, based on the binarized surface images of the polygons, and a value for discharging clear ink to be stored at coordinates inside the outermost periphery. Note that a value for discharging white ink may be stored at inside coordinates adjacent to coordinates for the outermost periphery to be colored. If white ink is arranged inside the outermost periphery, the ground color becomes white, and thereby the reproducibility of the applied color can be improved.

When the bitmap data has been generated for each cross section, the control unit 70 of the three-dimensional modeling apparatus 100 receives the bitmap data from the computer 200, controls the units such as the head unit 50 in accordance with the received bitmap data, and models the three-dimensional object by following the above-described procedure (step S50). As described above, the value indicating whether or not to form dots of each of the colors of C, M and Y is registered at the coordinates of the outermost periphery of each cross section data, and the value for discharging clear ink is stored at coordinates inside the coordinates of the outermost periphery. Therefore, in step S50, the object whose inner portion is transparent and whose surface is colored is modeled.

FIGS. 3(A) to 3(B) are diagrams for explaining a method for expressing a color in the first embodiment. In this embodiment, the head unit 50 models an object by discharging, into each unit grille UG, a curable liquid that is to be the material of a three-dimensional object. The unit grille UG is a grille that has a minimum volume that is in accordance with modeling resolutions of a cross section body in the X direction and the Y direction, and the lamination interval of the cross section body in the Z direction. One unit grille UG corresponds to one coordinate of bitmap data. The unit grille UG is also referred to as a voxel. In this embodiment, one unit grille UG is divided into three sub unit grilles (sub voxels) in the Z direction, and one type of ink out of C, M, Y, W and CL can be discharged into each of those sub unit grilles. In FIGS. 3(A) to (C), examples are shown in which one type of ink out of C, M and Y has been discharged into each unit grille UG. In addition, in FIGS. 3(D) to (F), examples are shown in which two types of ink out of C, M and Y have been discharged into a unit grille UG. In FIG. 3(G), an example is shown in which all the types of ink of C, M and Y have been discharged.

In this embodiment, in the case where one or more types of chromatic ink of C, M and Y are discharged into a unit grille UG and the spatial volume of the unit grille UG is not filled with the chromatic ink, the control unit 70 causes clear ink, which is achromatic ink, to be discharged into the unit grille UG in addition to the chromatic ink, such that the spatial volume of the unit grille UG is filled with both the chromatic ink and the achromatic ink. Therefore, in FIGS. 3(A) to (G), regardless of the number or type of the chromatic ink to be discharged into the unit grille UG, the total volumes of the ink discharged into the unit grilles UG are all the same. Note that the order of discharging the chromatic ink and the clear ink into one unit grille UG is arbitrary in this embodiment. Note that in the case of this embodiment for modeling an object using powder, the spatial volume of a unit grille UG is a volume obtained by deducting the volume of the powder included in the unit grille UG from the volume of the unit grille UG, and chromatic ink and achromatic ink are discharged so as to substantially fill the spatial volume.

In the three-dimensional modeling apparatus 100 of this embodiment described above, a three-dimensional object is colored in units finer than a unit grille UG, and therefore, compared with the case in which only one color is added for one unit grille UG, it is possible to improve an apparent resolution when expressing the image on the surface of the object by area gradation. In addition, even in the case where the total amount of chromatic ink discharged into a unit grille UG is smaller than the spatial volume of the unit grille UG, the remaining spatial volume of the unit grille UG is filled with clear ink in this embodiment, and therefore it becomes possible to uniformize the volumes of all the unit grilles UG constituting the three-dimensional object. Therefore, the three-dimensional object can be accurately modeled.

B. Second Embodiment

In the above first embodiment, only the outermost periphery of the three-dimensional object is colored. On the other hand, in a second embodiment, coloring is performed from the outermost periphery inwardly in the depth direction. The configuration of the three-dimensional modeling apparatus 100 in the second embodiment is the same as that of the first embodiment.

Figure 4:
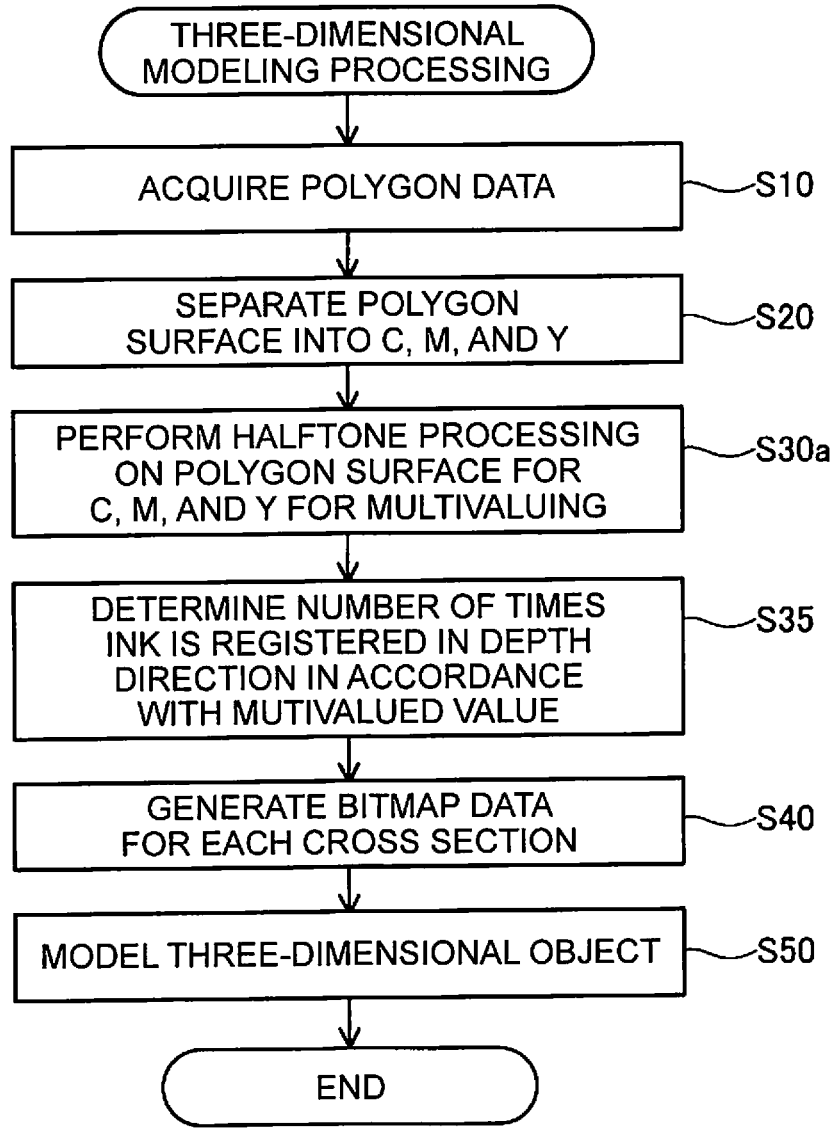
FIG. 4 is a flowchart of three-dimensional modeling processing in a second embodiment.

FIG. 4 is a flowchart of three-dimensional modeling processing in the second embodiment. In this flowchart, the same step numbers as those in FIG. 2 are given to steps having the same processing contents as those of the three-dimensional modeling processing in the first embodiment shown in FIG. 2.

In the second embodiment, when the computer 200 first acquires polygon data (step S10), the image on the surface of each of the polygons indicated by polygon data is separated into C, M and Y, similarly to the first embodiment (step S20). Subsequently, the computer 200 performs halftone processing for each color (step S30a). In this embodiment, in this step S30a, the computer 200 multivalues, instead of binarizing, the image on the surface of each of the polygons by performing halftone processing. In this embodiment, due to this multivaluing, an image is represented by area gradation using three types of dots, that is, "light dots", "intermediate dots" and "dark dots". A method of multivaluing is the same as known halftone processing for representing gradations with dots having different sizes such as "small dots", "intermediate dots", and "large dots".

When the polygons have been multivalued, the computer 200 determines the number of times chromatic ink is to be registered in the depth direction along the X and Y directions of the three-dimensional object in accordance with a multivalued value (step S35). In particular, if the multivalued value is a value that indicates "light-color dot", it is determined that ink of that color is to be registered for one unit grille UG in the depth direction. If the multivalued value is a value that indicates "intermediate color dot", it is determined that ink of that color is to be registered for two unit grilles UG in the depth direction. In addition, if the multivalued value is a value that indicates "deep-color dot", it is determined that ink of that color is to be registered for three unit grilles UG in the depth direction. That is, in this embodiment, the intensity of a color represented by chromatic ink as viewed from outside is expressed by changing the number of unit grilles UG, into which the chromatic ink is to be discharged, in a unit grille array UC (see FIG. 5) including a predetermined number (for example, three) of unit grilles UG that are consecutively aligned in the direction from the surface inwardly of the object.

When the processing of step S35 is completed, the computer 200 generates bitmap data for each cross section based on the number of times that each type of chromatic ink was registered in the depth direction, as determined in step S35 (step S40). The control unit 70 of the three-dimensional modeling apparatus 100 then models the three-dimensional object for each cross section in accordance with the generated bitmap data (step S50).

FIGS. 5(A) and 5(B) are diagrams showing examples in which chromatic ink has been registered in the depth direction of a three-dimensional object in accordance with this embodiment. As described above, in this embodiment, the chromatic ink is continuously registered in the depth direction of the object in the X direction or the Y direction in accordance with a value multivalued by performing halftone processing. For example, in an example shown in FIG. 5(A), a red color is expressed by yellow ink and magenta ink being registered for three unit grilles UG in the depth direction. In addition, in FIG. 5(B), yellow ink has been registered for three unit grilles UG in the depth direction, cyan ink has been registered for two unit grilles UG, and thereby a yellow-green color is expressed. In the case where the total amount of the chromatic ink discharged into a unit grille UG is smaller than the spatial volume of the unit grille UG, the remaining spatial volume of the unit grille UG is filled with clear ink similarly to the first embodiment. As in this embodiment, it is possible to reproduce 64 colors in total by combining four degrees of intensity and the colors of C, M and Y if the intensity is expressed with three unit grilles UG, and 27 colors in total can be reproduced by combining three degrees of intensity and those colors even if the intensity is expressed with two unit grilles UG. Because the necessity of expressing shading in a three-dimensional object is small compared to a two-dimensional image, the image on the surface can be sufficiently reproduced even with this number of colors.

As shown in FIG. 5, in this embodiment, in the case where a plurality of unit grilles UG, into which chromatic ink is to be discharged, exist in a unit grille array UC, the control unit 70 causes the chromatic ink to be discharged into the unit grilles UG such that the positions of the chromatic ink in the Z direction are the same, and causes the chromatic ink to be discharged into the unit grilles UG such that in the unit grille array UC, the chromatic ink is arranged on the surface side relative to clear ink. Thereby, color intensity of a colored portion can be precisely expressed. Note that it is also possible to register a plurality of types of chromatic ink in the depth direction so as to sandwich clear ink between chromatic ink. Here, causing the chromatic ink to be discharged such that the positions thereof in the Z direction are the same is discharging the chromatic ink into a plurality of unit grilles UG in the same order. For example, magenta ink (M) is discharged second in FIG. 5(A), and cyan ink (C) is discharged second in FIG. 5(B), and their positions in the Z direction are the same.

According to the second embodiment described above, not only is a three-dimensional object colored in units finer than a unit grille UG, but the object is also colored in the depth direction thereof, whereby the color intensity observed from outside of the object can be changed. Therefore, the number of colors that can be expressed per unit area on the surface of the object can be increased. As a result, not only does an apparent resolution improve, but a gradation resolution and color reproducibility can be improved. In addition, in this embodiment as well, the remaining spatial volume of a unit grille UG is filled with clear ink, and thus the volumes of all the unit grilles UG that constitute a three-dimensional object can be uniformized, enabling the three-dimensional object to be accurately modeled.

Note that in the second embodiment, achromatic ink arranged inside chromatic ink in the depth direction may be white ink, instead of clear ink. If the achromatic ink arranged in the inner portion is white ink, the ground color can be white, and thus intensity expression using the chromatic ink can be performed precisely. In addition, in the second embodiment, ink of lighter color (lower saturation) than the chromatic ink in the first embodiment such as light cyan, light magenta, or light yellow is preferably used as the chromatic ink in order to clearly express intensity difference.

C. Third Embodiment

In the above first embodiment, the total amount of chromatic ink discharged into a unit grille UG is smaller than the spatial volume of the unit grille UG, the remaining spatial volume of the unit grille UG is filled with clear ink. On the other hand, in a third embodiment, at least a portion of the remaining spatial volume of a unit grille UG is filled with white ink. The configuration of the three-dimensional modeling apparatus 100 in the third embodiment is the same as that of the first embodiment.

FIGS. 6(A) to 6(F) are diagrams showing examples in which at least a portion of the remaining spatial volume of a unit grille UG has been filled with white ink. In FIGS. 6(A) to (C), examples in which one type of ink out of C, M and Y, clear ink, and white ink are discharged into a unit grille UG are shown. In addition, in FIGS. 6(D) to (F), examples in which two types of ink out of C, M and Y, and white ink are discharged into a unit grille UG are shown. In this manner, in this embodiment, in the case of discharging two or less types of chromatic ink into a unit grille UG, a certain amount of white ink is discharged into the unit grilles UG.

According to the above-described third embodiment, in the case where the total amount of chromatic ink discharged into a unit grille UG is smaller than the spatial volume of the unit grille UG, white ink is discharged into at least a portion of the remaining spatial volume, and therefore the color of the chromatic ink is lifted by the white ink, making it possible to improve the apparent saturation of the colors. In addition, in this embodiment, a certain amount of white ink is discharged regardless of the remaining spatial volume of the unit grille UG, and therefore variation in saturation among unit grilles UG can be suppressed. Note that the entirety of the remaining spatial volume of the unit grille UG can be filled with white ink.

D. Fourth Embodiment

Figure 7:
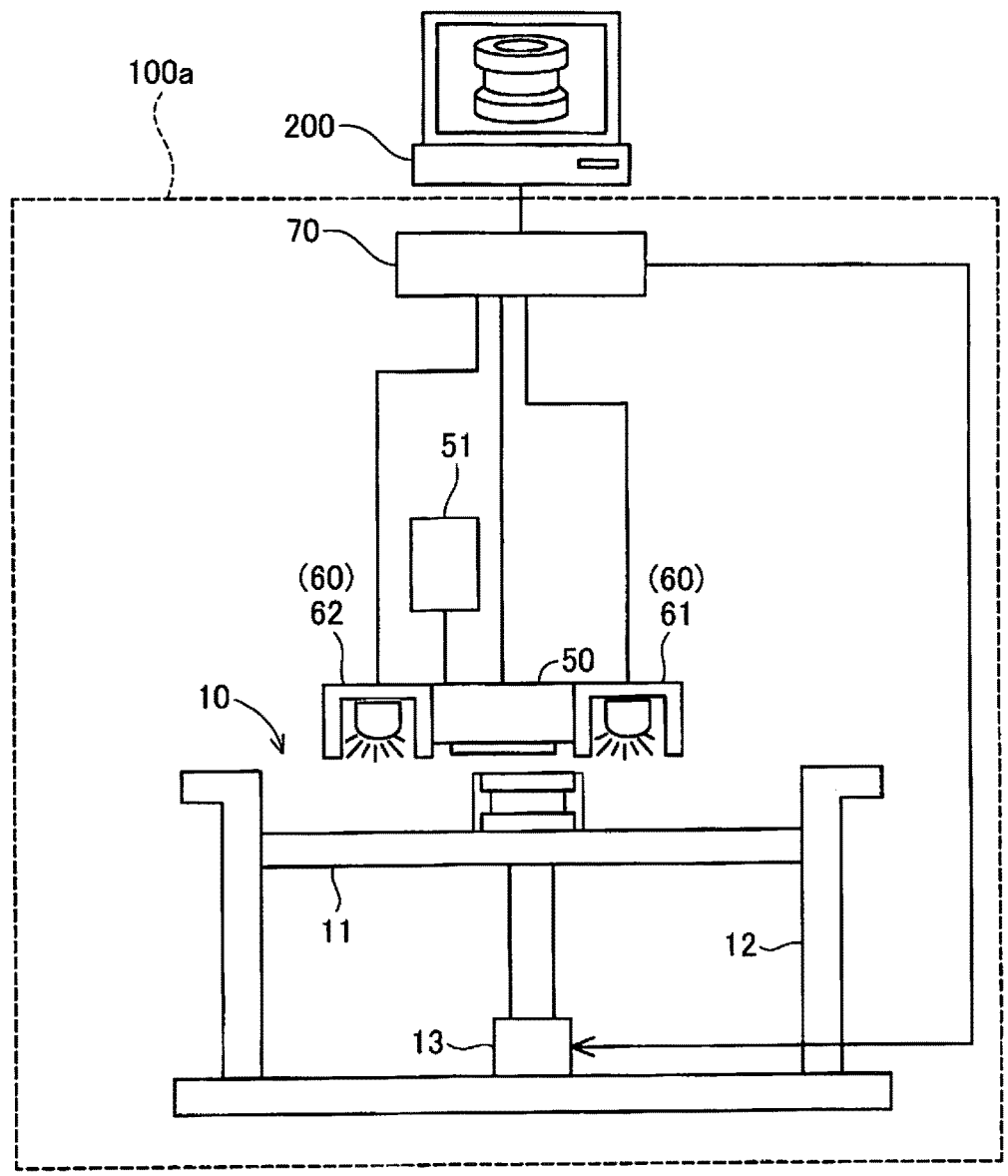
FIG. 7 is an explanatory diagram showing a schematic configuration of a three-dimensional modeling apparatus in a fourth embodiment.

FIG. 7 is an explanatory diagram showing the schematic configuration of a three-dimensional modeling apparatus in a fourth embodiment. The three-dimensional modeling apparatus 100 of the first embodiment models a three-dimensional object by discharging a curable liquid onto powder supplied into the modeling unit 10. On the other hand, a three-dimensional modeling apparatus 100a of the fourth embodiment models a three-dimensional object using only a curable liquid containing resin without using powder.

The three-dimensional modeling apparatus 100a is provided with the modeling unit 10, the head unit 50, the curing energy applying unit 60 and the control unit 70. The modeling unit 10 is provided with the modeling stage 11, the frame body 12 and the actuator 13 similarly to the first embodiment. However, the frame body 12 may be omitted. The tank 51 is connected to the head unit 50. The curing energy applying unit 60 is provided with the main curing light emitting apparatus 61 and the provisional curing light emitting apparatus 62. That is, the three-dimensional modeling apparatus 100a has many portions in common with the configuration of the three-dimensional modeling apparatus 100 of the first embodiment, and has a configuration in which the powder supply unit 20, the flattening mechanism 30 and the powder collecting unit 40 are omitted from the three-dimensional modeling apparatus 100 of the first embodiment. Such a three-dimensional modeling apparatus 100a can also model a three-dimensional object by the same processing as that of the three-dimensional modeling apparatus 100 of the first embodiment, except for the processing for forming a powder layer. Note that in the case of this embodiment, chromatic ink and achromatic ink are discharged into the spatial volume of a unit grille UG such that the volume of the discharged ink is substantially the same as the volume of the unit grille UG.

E. Modifications

Modification 1

In the above embodiments, the three-dimensional modeling apparatus 100 colors the outermost periphery of a three-dimensional object, but clear ink for protecting a colored portion may be discharged onto the outer periphery side of the colored portion.

Modification 2

In the above embodiments, the head unit 50 relatively moves in the Z direction by the modeling stage 11 moving in the Z direction. However, the position of the modeling stage 11 may be fixed and the head unit 50 may be moved directly in the Z direction. In addition, the head unit 50 moves in the X direction and the Y direction in the above embodiments, but the position of the head unit 50 may be fixed in the X direction and the Y direction, and the modeling stage 11 may be moved in the X direction and the Y direction.

Modification 3

In the above embodiments, out of three-dimensional modeling processes shown in FIGS. 2 and 4, the processes of steps S10 to S40 are executed by the computer 200. However, those processes may be executed by the three-dimensional modeling apparatus 100. That is, the three-dimensional modeling apparatus 100 may execute all the processes from the acquisition of polygon data to the modeling of a three-dimensional object by itself. In addition, in the above embodiments, the process of step S50 shown in FIGS. 2 and 4 is executed by the control unit 70 of the three-dimensional modeling apparatus 100. However, the process of step S50 may be executed by the computer 200 controlling the units of the three-dimensional modeling apparatus 100. That is, the computer 200 may perform the functions of the control unit 70 of the three-dimensional modeling apparatus 100.

The invention is not limited to the above embodiments, examples, and modifications, and can be achieved in various configurations without departing from the gist of the invention. For example, the technical features in the embodiments, examples, and modifications corresponding to the technical features in the modes can be replaced or combined as appropriate in order to solve some or all of the problems described above, or in order to achieve some or all of the aforementioned effects. Technical features that are not described as essential in the specification can be deleted as appropriate.

The entire disclosure of Japanese patent No. 2015-034858, filed Feb. 25, 2015 is expressly incorporated by reference herein.

What is claimed is:

1. A three-dimensional modeling apparatus for modeling a three-dimensional object by laminating a plurality of cross section bodies in a Z direction, the three-dimensional modeling apparatus comprising:
    a head unit for modeling the object by discharging a liquid that is to be a material of the object into each unit grille that is defined in accordance with a modeling resolution of the cross section body in an X direction, a modeling resolution of the cross section body in a Y direction, and a lamination interval of the cross section body in the Z direction; and
    a control unit for controlling the head unit,
    wherein the head unit is capable of individually discharging, into the unit grille, an achromatic liquid and a plurality of types of chromatic liquids for expressing a designated color, and
    in a case where one or more types of the chromatic liquids are discharged into the unit grille by controlling the head unit and the spatial volume of the unit grille is not filled with the one or more types of chromatic liquids, the control unit causes the achromatic liquid to be discharged into the unit grille in addition to the one or more types of chromatic liquids so as to fill the spatial volume of the unit grille with both the chromatic liquids and the achromatic liquid.

2. The three-dimensional modeling apparatus according to claim 1,
    wherein the control unit, regarding one chromatic liquid out of the plurality of types of chromatic liquids, expresses color gradation represented by the one chromatic liquid by changing the number of unit grilles, into which the one chromatic liquid is to be discharged, in a unit grille array in which the unit grilles are aligned in a direction from the surface toward an inside of the object.

3. The three-dimensional modeling apparatus according to claim 2,
    wherein in a case where a plurality of the unit grilles into which the one chromatic liquid is to be discharged exist in the unit grille array,
    the control unit discharges the one chromatic liquid into the unit grilles such that positions of the one chromatic liquid in the Z direction are the same, and
    discharges the one chromatic liquid into the unit grilles such that the one chromatic liquid is arranged on the surface side relative to the achromatic liquid in the unit grille array.

4. The three-dimensional modeling apparatus according to claim 3,
    wherein the color of the achromatic liquid is white.

* * * * *